(12) United States Patent
Blasko et al.

(10) Patent No.: US 7,588,466 B2
(45) Date of Patent: Sep. 15, 2009

(54) FILTERED ELECTRICAL CONNECTOR AND COMBINATION HAVING SAME

(75) Inventors: Raymond J. Blasko, Boardman, OH (US); Dominic A. Messuri, Canfield, OH (US); Hoi Lui, Warren, OH (US); Robert C. Beer, Noblesville, IN (US); Christopher A. Margrave, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 11/893,591

(22) Filed: Aug. 16, 2007

(65) Prior Publication Data

US 2008/0070444 A1    Mar. 20, 2008

Related U.S. Application Data

(60) Provisional application No. 60/844,826, filed on Sep. 15, 2006.

(51) Int. Cl.
  *H01R 13/66*    (2006.01)
(52) U.S. Cl. .................. 439/620.09; 320/111
(58) Field of Classification Search ............ 439/620.01, 439/620.06–620.09, 620.13–620.15, 620.17, 439/620.2–620.24, 95, 956; 320/111; 174/359, 174/360
See application file for complete search history.

(56) References Cited

U.S. PATENT DOCUMENTS

| | | | | |
|---|---|---|---|---|
| 4,674,809 A | | 6/1987 | Hollyday et al. | |
| 5,101,322 A | * | 3/1992 | Ghaem et al. | 361/715 |
| 5,438,160 A | * | 8/1995 | Batty | 174/360 |
| 5,599,208 A | * | 2/1997 | Ward | 439/620.09 |
| 6,165,019 A | * | 12/2000 | Kha et al. | 439/620.03 |
| 6,380,826 B1 | * | 4/2002 | Palinkas | 333/175 |
| 6,476,688 B2 | * | 11/2002 | Palinkas | 333/175 |
| 6,839,214 B2 | * | 1/2005 | Berberich | 361/112 |
| 7,094,104 B1 | | 8/2006 | Burke et al. | |
| 7,168,989 B2 | * | 1/2007 | Faulkner | 439/620.22 |
| 7,270,575 B2 | * | 9/2007 | Krantz et al. | 439/620.15 |
| 7,306,490 B1 | * | 12/2007 | Jeter | 439/620.09 |
| 2007/0298661 A1 | * | 12/2007 | Montena | 439/620.01 |

FOREIGN PATENT DOCUMENTS

DE    4311639    10/1994

OTHER PUBLICATIONS

European Search Report dated Mar. 16, 2009.

* cited by examiner

*Primary Examiner*—T C Patel
*Assistant Examiner*—Harshad C Patel
(74) *Attorney, Agent, or Firm*—Thomas N. Twomey

(57) ABSTRACT

A filtered electrical connector for a power module comprises a connector body having a back wall partly defining a chamber at one end of the connector body. An alternating current filter is retained in the chamber, and a terminal extends through the back wall, the chamber, and the alternating current filter disposed in the chamber. The filtered electrical connector is attached to a housing having a metal portion with the chamber disposed in a pass-through hole of the housing. The terminal is attached to an electrical circuit inside the housing and the alternating current filter is grounded on the metal portion of the housing to filter alternating current flowing outside of the housing from the electrical circuit inside the housing via the terminal.

16 Claims, 6 Drawing Sheets

US 7,588,466 B2

FILTERED ELECTRICAL CONNECTOR AND COMBINATION HAVING SAME

REFERENCE TO RELATED APPLICATIONS

This application claims the benefit of U.S. Provisional Ser. No. 60/844,826 filed Sep. 15, 2006.

BACKGROUND OF THE INVENTION

The present invention relates generally to electrical connectors and more particularly to a filtered electrical connector and a combination having same.

In hybrid vehicle electrical systems, an auxiliary power module (APM) provides a high current 14 volt power circuit for a conventional electrical center and other conventional electrical devices in the vehicle, such as those in lighting, entertainment and climate control systems. It has been found that undesirable levels of electromagnetic interference (EMI) are coupled to this high current power circuit that is provided by the APM. Conducting these undesirable levels of EMI outside the APM housing results in radio frequency interference as well as interference with the electrical functions of the electrical center and conventional electrical devices in the vehicle. Known methods to filter the EMI from an electrical circuit inside a APM housing or the like involve placing high frequency alternating current filters in the electrical circuits which are generally part of a printed circuit board assembly or assemblies inside the housing. This known method is not only expensive but also does not meet the desired EMI compliance limit in many cases.

SUMMARY OF THE INVENTION

The present invention provides a cost effective system and method for filtering undesired frequencies of alternating current from internal circuitry of an auxiliary power module or the like.

The present invention provides to a filtered electrical connector that can be installed in a pass-through hole in a housing to filter undesired frequencies of alternating current from an electrical circuit inside the housing at the pass-through hole. Filtering undesired frequencies of alternating current of the internal electrical circuit as it exits the housing result in a very effective filter.

The filtered electrical connector preferably comprises an alternating current filtering printed circuit board (PCB) assembly. The filtered electrical connector may include a male blade terminal in a connector body that is inserted through a receiving slot in the PCB assembly. The male blade terminal may have a first end configured to accept a female terminal and may have a second end configured to be electrically and mechanically coupled to a bus bar for an electrical circuit inside a housing.

The filtered electrical connector preferably has an alternating current filtering printed circuit board assembly that is preferably grounded to a metal portion of the housing when the filtered electrical connector is mated to the housing. The alternating current filtering printed circuit board assembly may comprise one or more cantilevered output terminals that are soldered into plated-through holes of the printed circuit board and positioned for contacting the metal portion of the housing, which may be for example, a tin-plated copper alloy ferrule pressed into a pass-through hole in a cast aluminum housing.

The filtered electrical connector may comprises an alignment cap configured to provide alignment for cantilevered output grounding terminals as the filtered electrical connector is inserted into the pass-through hole and attached to the housing. The alignment cap may also be configured to provide over-stress protection for the cantilevered output grounding terminals and may also be configured to provide retention of a peripheral seal.

The alternating current filtering PCB assembly may comprise one or more filtering devices such as capacitors, inductors, resistors and/or ferrites configured for providing alternating current filtering within a desired frequency range. Opposing ends of the filtering device or devices may be electrically connected through traces on the PCB to an input grounding terminal and cantilevered output grounding terminals protruding from the PCB surface respectively.

The filtered electrical connector may be configured to provide a chamber for the PCB assembly that accepts the dispensing and curing of sealant such as a silicone sealant around the male blade terminal and filtering devices, on at least one side of the PCB, thereby providing strain relief to the devices and enabling the filtered electrical connector to be sealed even in the absence of a mating female connector.

BRIEF DESCRIPTION OF THE DRAWINGS

By way of example, the invention will now be described with reference to the accompanying drawings, in which.

DETAILED DESCRIPTION OF PREFERRED EMBODIMENTS

Figure 4:
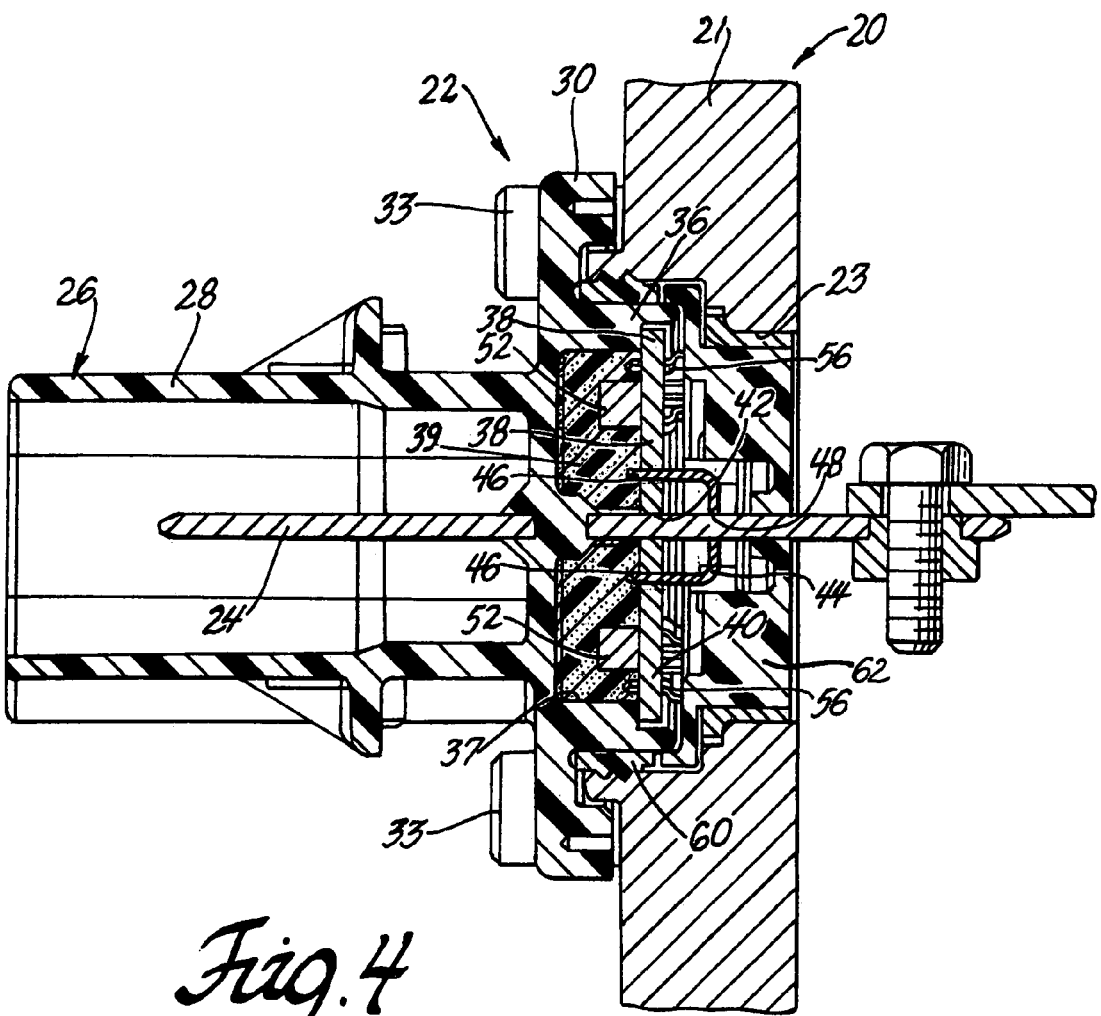
FIG. 4 is a longitudinal section of the auxiliary power module shown in FIGS. 1 and 2.

In reference to FIGS. 1-8, an auxiliary power module 20 comprises a metal housing 21, usually cast aluminum, and a filtered electrical connector 22 that is attached to the metal housing 21 at a pass-through hole 23. The filtered electrical connector 22 comprises a male blade terminal 24 that is preferably insert molded in a plastic connector body 26. A first end of the male blade terminal 24 accepts a suitable female terminal (not shown), while the second end accepts a bolted connection to a bus bar inside the metal housing 21 of auxiliary power module 20 as best shown in FIG. 4.

Connector body 26 may include a shroud or socket 28 at a rearward end that accepts a mating electrical connector plug (not shown) that houses the female terminal that connects to the first end of the male blade terminal 24. Connector body 26 has a medial rectangular flange 30 with corner holes 32 that accept a series of attachment screws 33 for attaching the plastic connector body 26 to the metal housing 21 of power module 20. Flange 30 also includes at least one protruding pin 34 that protrudes into a mating hole 35 in the face of housing 21 for indexing the header connector 22 with respect to housing 21.

Figure 6:
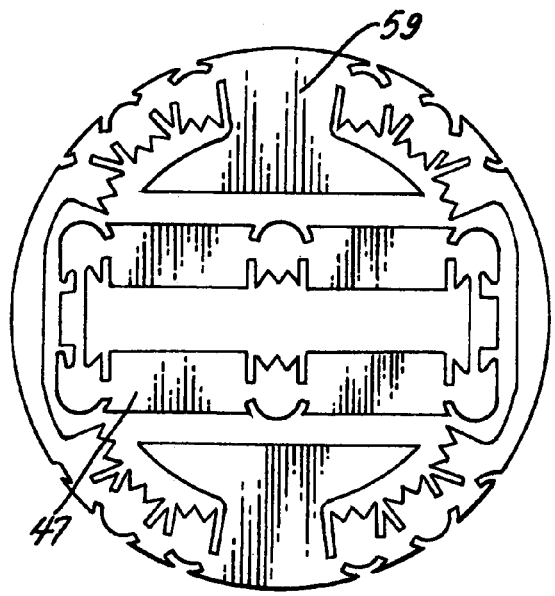
FIG. 6 is a front view of a printed circuit board of the current filter element.
Figure 5:
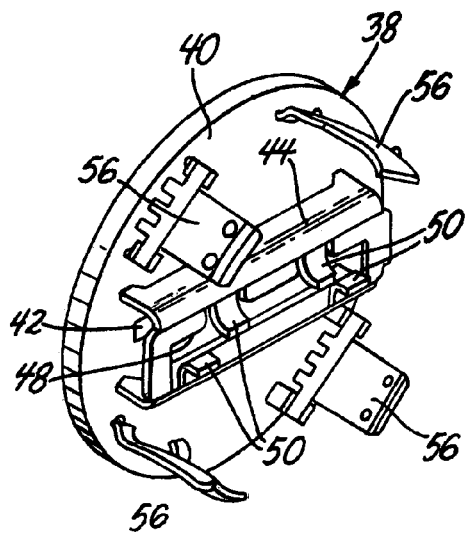
FIG. 5 is a front perspective view of a current filter element that is shown in FIGS. 1 and 2.
Figure 7:
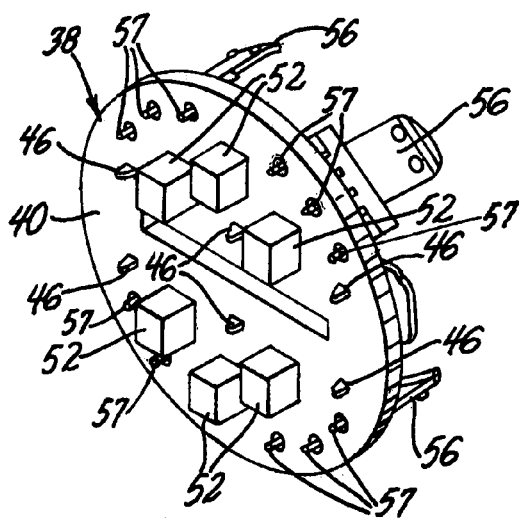
FIG. 7 is a rear perspective view of the current filter element that is shown in FIG. 5.
Figure 8:
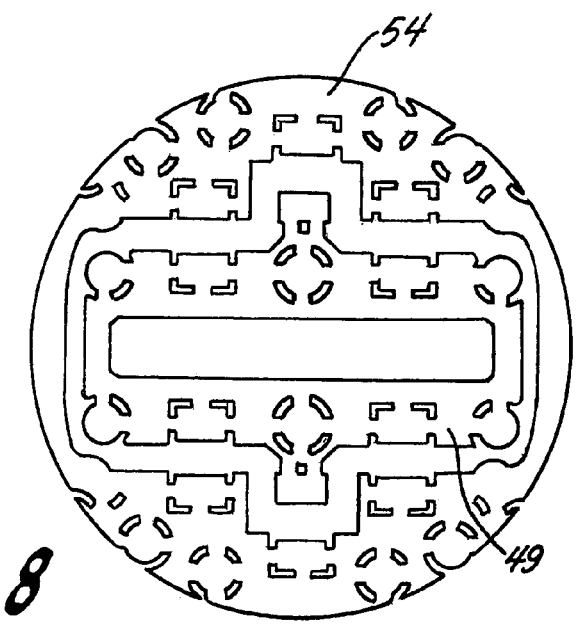
FIG. 8 is a rear view of the printed circuit board that is shown in FIG. 6.

A circular shroud 36 projects from medial flange 30 at the forward end of the connector body 26 that forms an internal back wall for an open ended chamber 37 for an alternating current filter 38. Filter 38 includes a circular printed circuit board 40 that has a slot 42 for passing the end of the male blade terminal 24 through the printed circuit board when it is placed in the chamber 37. A channel shaped input ground terminal 44 is attached to a forward side of the printed circuit board 40 by a plurality of feet 46 that project through plated holes of the printed circuit board 40. The feet 46 are soldered in the plated holes that form part of inner annular electrical traces 47 and 49 on the front and back sides of the printed circuit board 40, respectively. Inner annular electrical traces 47 and 49 are shown in FIGS. 6 and 8 respectively. These traces are not shown in FIGS. 5 and 7 in the interests of clarity.

The top of the channel shaped input ground terminal 42 has a slot 48 that is aligned with the slot 42 of the printed circuit board 40 for passing of the end of the male blade terminal 24 through the input ground terminal 42 when the printed circuit board is placed in the chamber 37. Input ground terminal 42 includes four spring tabs 50 at the edge of slot 48 that biasingly engage the end of the male blade terminal 24 to enhance the electrical contact with the male blade terminal 24 when it passes through slot 48.

The inner annular electrical, preferably copper, traces 47 and 49 on the respective front and back sides of the printed circuit board connect ground terminal 42 to a series of surface mounted filter devices 52 which filter undesired frequencies of alternating current from the electric circuit (not shown) inside the housing 21 that is connected to the male blade terminal 24 by a bus bar that is shown in FIG. 4. The number and types of filtering devices 52 such as capacitors, inductors, resistors and/or ferrites and their values may be selected to provide alternating current filtering within a desired frequency range, for instance to eliminate electromagnetic interference (EMI) and/or radio frequency interference (RFI).

The series of surface mounted filter devices 52 in turn are electrically connected via an outer annular electrical trace 54 on the rear side of the printed circuit board 40 to a plurality of circumferentially spaced, cantilevered output ground terminals 56 that protrude from the front side of the printed circuit board 40 near its rim. Like the channel shaped input ground terminal 42 for the male blade terminal 24, these cantilevered output ground terminals 56 also may have a plurality of feet 57 that are soldered into plated holes of the printed circuit board 40 that form part of the electrical trace 54. The front side of the printed circuit board 40 also preferably has an outer annular electrical trace 59 that interconnects the cantilevered output ground terminals 56 via the plated holes. This second interconnection of the output ground terminals 56 enhances filtering of the alternating current.

Figure 1:
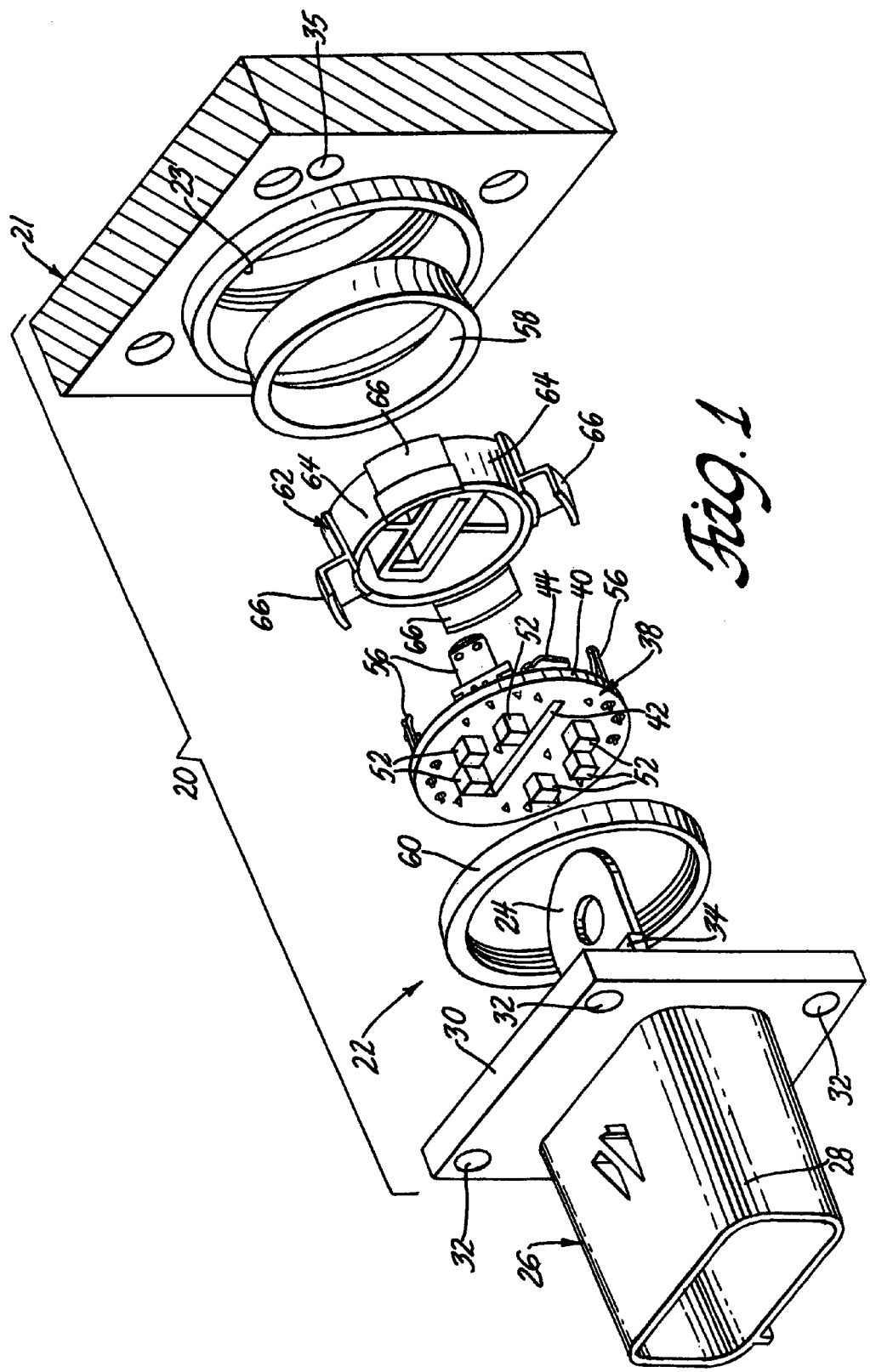
FIG. 1 is an exploded perspective view of an auxiliary power module (APM) having a filtered electrical connector in accordance with an embodiment of the present invention.
Figure 2:
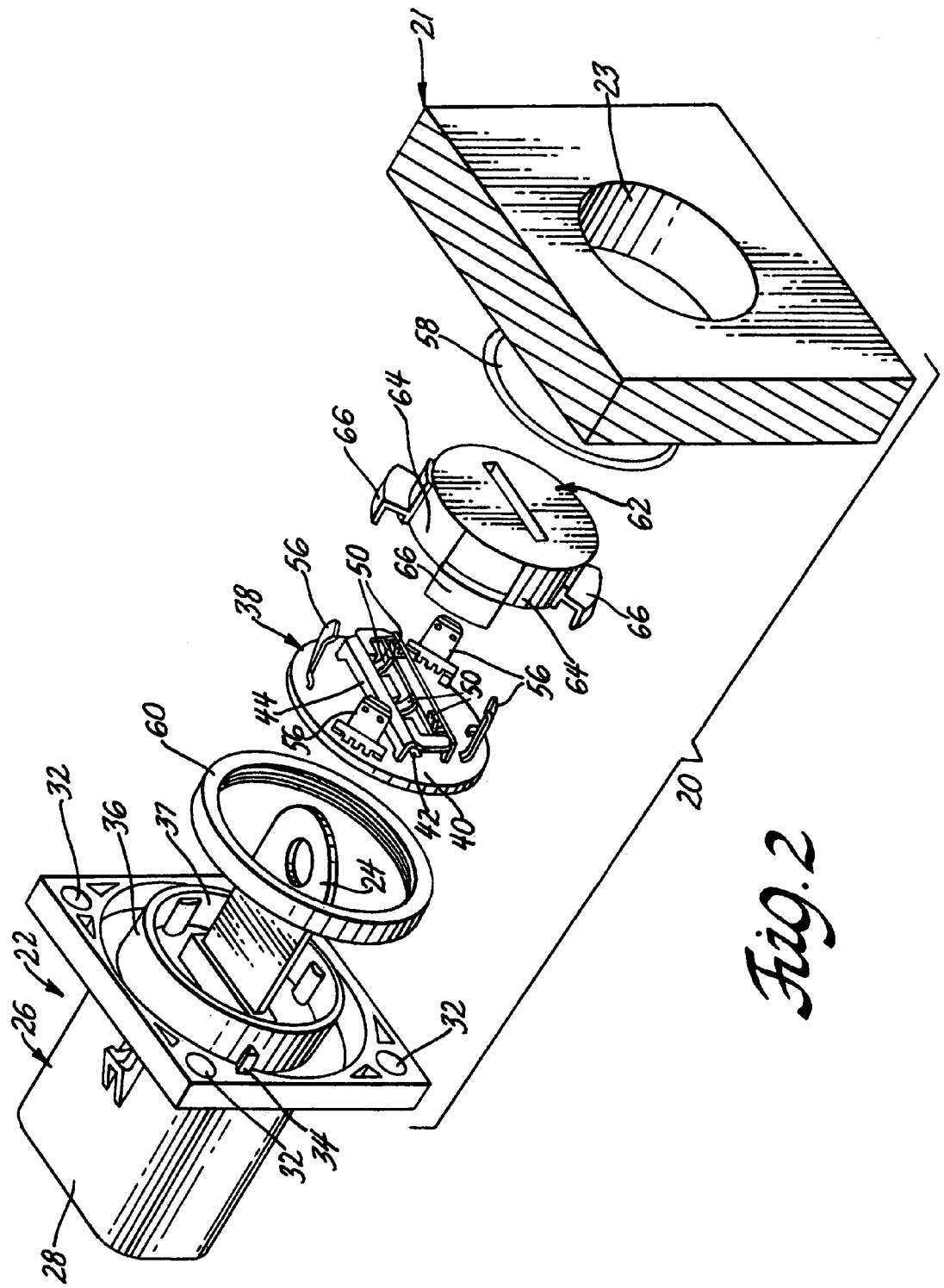
FIG. 2 is another exploded perspective view of the auxiliary power module (APM) and the filtered electrical connector shown in FIG. 1.
Figure 3:
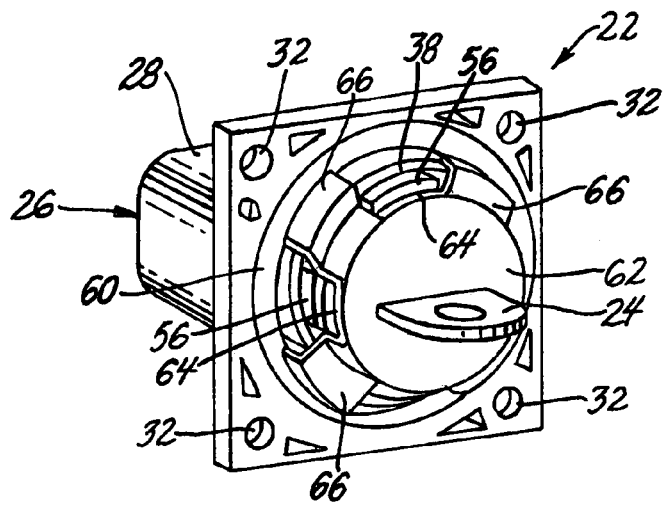
FIG. 3 is an assembled perspective view of the filtered electrical connector shown in FIGS. 2 and 3.

The printed circuit board 40 nests in chamber 37 formed by shroud 36 of the connector body 26 where it rests upon four pedestals that provide space for the filter devices 52 on the back side of the printed circuit board 40 as best shown in FIGS. 2 and 4. The pedestals also position the printed circuit board 40 so that the cantilevered output ground terminals 56 project forward of the shroud 36. The chamber 37 is preferably filled with a sealant 39 such as a silicone sealant that can be dispensed and cured around the male blade terminal 24 and the filter devices 52 on the back side of the printed circuit board 40 as shown in FIG. 4. The sealant seals the interior chamber 37 of the connector body 26 even in the absence of a mating electrical connector plug in socket 28. The sealant also provides strain relief for the surface mounted filter devices 52.

The cantilevered output ground terminals 56 may contact the pass-through hole 23 of the metal housing 21 to ground the SMT capacitors 52 when the filtered electrical connector 22 is attached to the metal housing 21. However, a ferrule 58 of tin-plated copper alloy or other good conductive material is preferably pressed into the pass-through hole 23 of the metal housing 21 to engage the output ground terminals 56 to provide a good electrical interface when the metal housing 21 is made of cast aluminum. The ferrule 58 may also be used to maintain a low circuit contact resistance.

A silicone peripheral seal ring 60 is disposed around the shroud 36 that protrudes into the exit hole 23 of the metal housing 21 to provide a sealed interface between the filtered electrical connector 22 and the housing 21 of power module 20.

The filtered electrical connector 22 preferably includes an alignment cap 62 that fits on the end of the shroud 36. The outer periphery of the cap 62 has four circumferentially spaced spaces 64 for receiving the cantilevered output ground terminals 56 between four circumferentially spaced, L-shaped feet 66. The L-shaped feet 66 fit on the end of the shroud 36 to hold the peripheral seal 60 in place. Alignment cap 62 provides alignment for guiding the cantilevered output ground terminals 56 of the filtered electrical connector 22 into the pass-through hole 23 of the metal housing 21 when the filtered electrical connector 22 is assembled to the metal housing 21, provides over-stress protection to the cantilevered output ground terminals 56, and provides retention of the peripheral seal ring 60.

Filtering the electrical circuit as it exits the auxiliary power module 20 provides very effective filtering because the filtering removes the undesired frequencies from the circuit path at the point it exits the metal housing 21. The proximity of the filter devices 52 to the pass-through male blade terminal 24, the radial placement of the cantilevered output grounding terminals 56, and the multi-point contact interfacing of the input grounding terminal 44 to the male blade terminal 24, provide minimal circuit inductance and resistance resulting in superior high frequency filtering performance.

Figure 9:
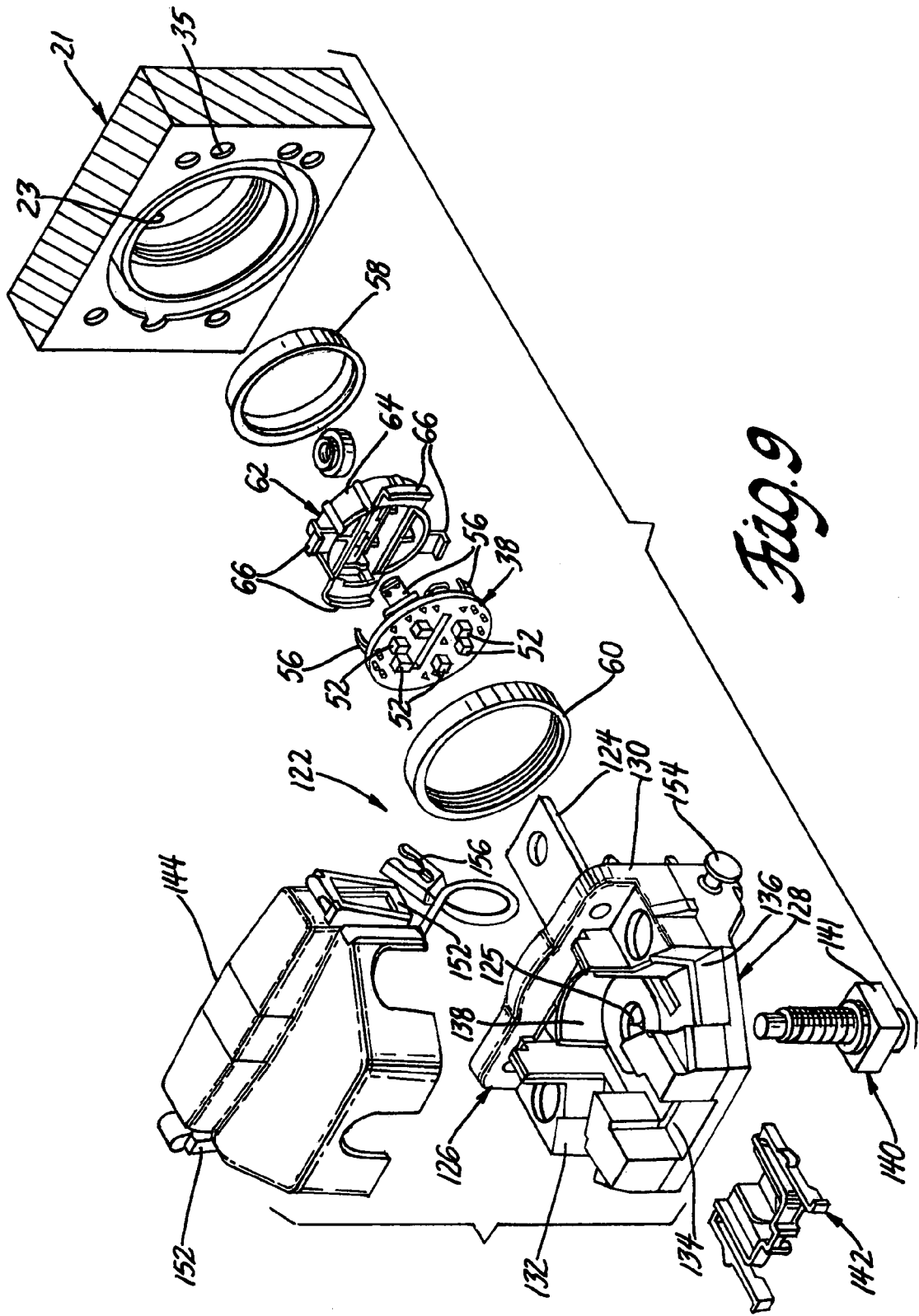
FIG. 9 is an exploded perspective view of a second filtered electrical connector in accordance with the present invention.
Figure 10:
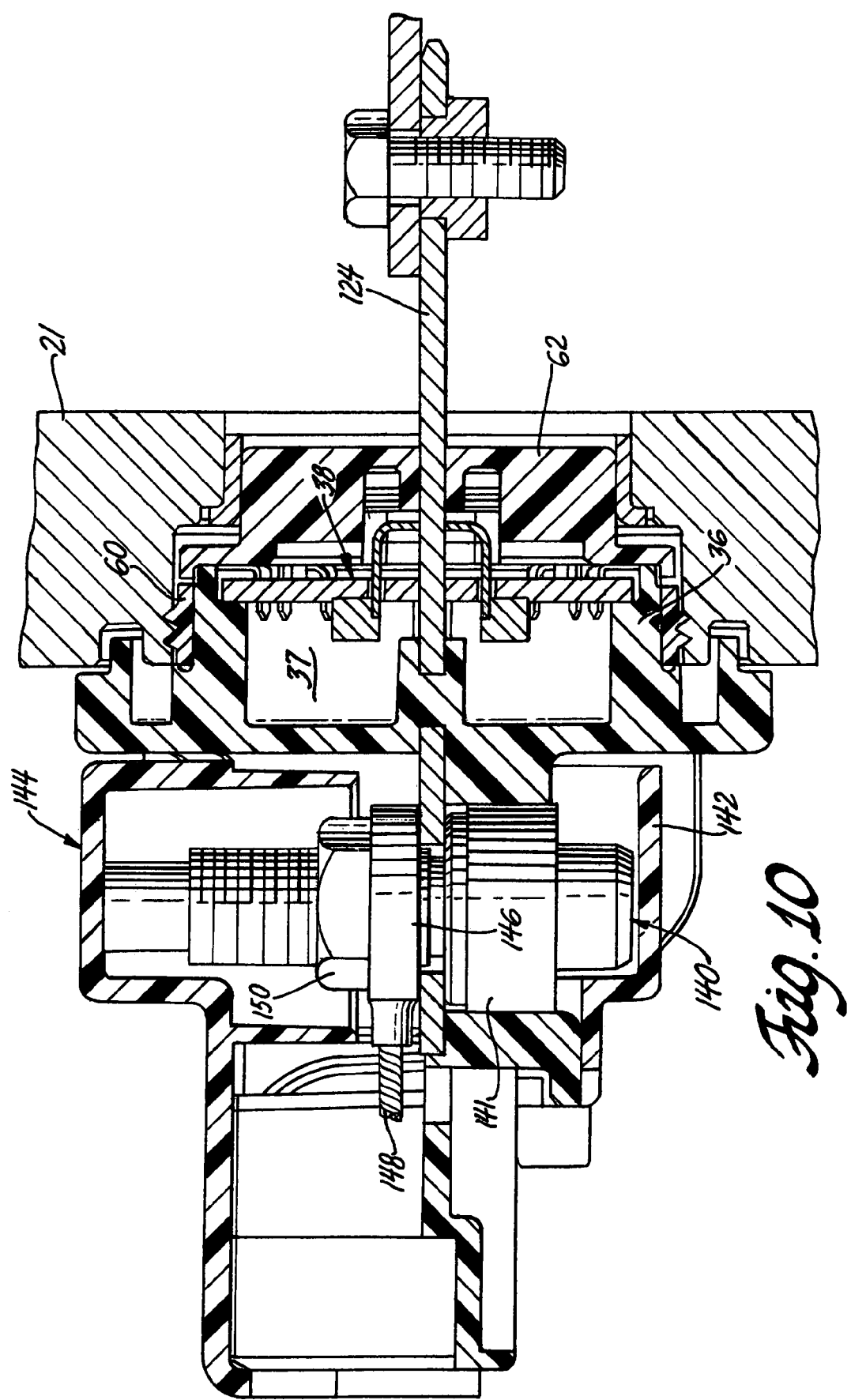
FIG. 10 is a longitudinal section of the second filtered electrical connector shown in FIG. 9.

Referring now to FIGS. 9 and 10, the APM 20 has a second filtered electrical connector in accordance with the present invention that is indicated generally at 122. Electrical connector 122 has portions that are identical or substantially identical to portions of electrical connector 22 and corresponding identical or substantially identical portions are identified with the same numerals. The major difference between the two electrical connectors lies in the mating or rear end of the filtered electrical connector. Whereas electrical connector 22 is designed to connect with a mating electrical plug connector, electrical connector 122 is designed to mate with a battery cable ring terminal. In this regard the rearward end of the connector body 126 of the filtered electrical connector 122 has an attachment tray 128 that extends rearward of the medial rectangular flange 130 that is adapted for attachment to housing 21 of APM 20.

Attachment tray 128 includes three channels 132, 134 and 136 that intersect at a common chamber 138 that receives the rear end of the male blade terminal 124. Male blade terminal 124 has a through hole 125 in the rear end but is otherwise substantially identical to male blade terminal 24.

Filtered electrical connector 122 also includes a threaded stud 140, a retainer 142 and a cover 144 at the rearward end of connector body 126. Stud 140 has a square head 141 that fits in a square through hole 142 in attachment tray 128. The upper threaded portion of stud 140 is inserted into through hole 142, then through hole 125 of male blade terminal 124 from the bottom of attachment tray 128 and then retained by retainer 142 which is attached to the bottom of attachment tray 128 as best shown in FIG. 10. The threaded stud 140 then receives a ring terminal 146 at the end of a battery cable 148 that may be inserted into any of the three channels 132, 134 or 136 that intersect the common chamber 138. Ring terminal 146 is then secured to the upper threaded end of the stud 140 by a nut 150. The channels 132, 134 and 136 and the chamber 138 are then covered by cover 144 which is attached to connector body 126 by latch arms 152 that snap over outer heads of lateral lock pins 154 of the connector body 126. Tethered lock clips 156 then snap onto outer heads of the lock pins 154 to lock the latch arms 152 on the lateral lock pins 154.

As indicated above, the filtered electric connector 122 forward of the flange 132 is substantially identical to the forward end of the filtered electric connector 122 with the corresponding portions identified by the same numerals. Briefly, the forward end of the filtered electric connector 122 comprises a chamber 37 formed by a back wall and a circular shroud 36 of the connector body 126, a filter 38, a seal ring 60 and an alignment cap 62 that are described above in detail in connection with filtered electric connector 22.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A filtered electrical connector comprising:
a connector body having a back wall partly defining a chamber at one end of the connector body,
an alternating current filter retained in the chamber, and
a terminal extending through the back wall, the chamber, and the alternating current filter disposed in the chamber,
wherein the alternating current filter comprises a printed circuit board having an input grounding terminal contacting the terminal that extends through the back wall, the chamber, and the alternating current filter disposed in the chamber, and
wherein the alternating current filter comprises a filter device electrically connected to the input grounding terminal, and an output grounding terminal electrically connected to the filter device.

2. The filtered electrical connector as defined in claim 1 wherein the terminal is a blade terminal that extends through a slot of the printed circuit board, wherein the input grounding terminal is attached to the printed circuit board and has a slot through which the blade terminal extends, and
wherein the input grounding terminal has spring tabs that biasingly engage the blade terminal.

3. A filtered electrical connector comprising:
a connector body having a back wall partly defining a chamber at one end of the connector body,
an alternating current filter retained in the chamber, and
a terminal extending through the back wall, the chamber, and the alternating current filter disposed in the chamber,
the alternating current filter having a printed circuit board, an input grounding terminal attached to the printed circuit board contacting the terminal that extends through the back wall, the chamber, and the filter disposed in the chamber, and a filter device attached to the printed circuit board and electrically connected to the input grounding terminal by an inner electrical trace, and an output grounding terminal attached to the printed circuit board radially outward of the input grounding terminal and electrically connected to the filter device by an outer electrical trace, the output grounding terminal extending axially outward of the chamber.

4. The filtered electrical connector as defined in claim 3 wherein the chamber is an open-ended chamber, wherein the connector body has a shroud that projects forwardly of the end wall to partly define the open-ended chamber, wherein a cap is mounted on the shroud to at least partially close the open-ended chamber and to protect the filter device, and wherein the terminal projects though the cap.

5. The filtered electrical connector as defined in claim 3 wherein the input grounding terminal is mounted on a side of the printed circuit board remote from the end wall, wherein the filter device is included in a plurality of surface mounted filter devices that are attached to an opposite side of the printed circuit board and electrically connected to the input grounding terminal by an inner electrical trace on the opposite side of the printed circuit board, and wherein the output grounding terminal is included in a plurality of circumferentially spaced output grounding terminals that are attached to the printed circuit board in cantilever fashion radially outward of the input grounding terminal and electrically connected to the plurality of surface mounted filter devices by an outer electrical trace on the opposite side of the printed circuit board, the plurality of output grounding terminals extending axially outward of the side of the printed circuit board remote from the end wall and the chamber.

6. The filtered electrical connector as defined in claim 5 wherein the input grounding terminal has a plurality of feet that are soldered in plated through holes of the printed circuit board and that are interconnected by the inner annular trace on the opposite side of the printed circuit board and an inner annular trace on the one side of the printed circuit board.

7. The filtered electrical connector as defined in claim 5 wherein the plurality of output grounding terminals have feet that are soldered in plated through holes of the printed circuit board and that are interconnected by the outer annular trace on the opposite side of the printed circuit board and an outer annular trace on the one side of the printed circuit board.

8. The filtered electrical connector as defined in claim 7 wherein the connector body has a socket at a rearward end for receiving a mating electrical connector plug.

9. A filtered electrical connector comprising:
a connector body having a back wall partly defining a chamber at one end of the connector body,
an alternating current filter retained in the chamber, and a terminal extending through the back wall, the chamber, and the alternating current filter disposed in the chamber, the alternating current filter having a printed circuit board, an input grounding terminal attached to the printed circuit board contacting the terminal that extends through the chamber, a filter device attached to the printed circuit board and electrically connected to the input grounding terminal by an inner electrical trace, and an output grounding terminal attached to the printed circuit board radially outward of the input grounding terminal and electrically connected to the filter device by an outer electrical trace, the output grounding terminal extending axially outward of the chamber, wherein the input grounding terminal is mounted on one side of the printed circuit board, wherein the filter device is included in a plurality of surface mounted filter devices that are attached to an opposite side of the printed circuit board and electrically connected to the input grounding terminal by an inner electrical trace on the opposite side of the printed circuit board, and wherein the output grounding terminal is included in a plurality of circumferentially spaced output grounding terminals that are attached to the printed circuit board in cantilever fashion radially outward of the input grounding terminal and electrically connected to the plurality of surface mounted filter devices by an outer electrical trace on the opposite side of the printed circuit board, the plurality of output grounding terminals extending axially outward of the chamber, and wherein the chamber is an open-ended chamber, wherein the connector body has a shroud that projects forwardly of the back wall to partly define the open-ended chamber, wherein a cap is mounted on the shroud to close the open-ended chamber and protect the current filter, wherein the terminal projects though the cap, wherein the plurality of output grounding terminals are disposed adjacent an outer peripheral surface of the cap, and wherein the chamber is filled with a sealant between the back wall of the connector body and the opposite side of the printed circuit board.

10. A filtered electrical connector comprising:

a connector body having a back wall partly defining a chamber at one end of the connector body, an alternating current filter retained in the chamber, and a terminal extending through the back wall, the chamber, and the alternating current filter disposed in the chamber, the alternating current filter having a printed circuit board, an input grounding terminal attached to the printed circuit board contacting the terminal that extends through the chamber, a filter device attached to the printed circuit board and electrically connected to the input grounding terminal by an inner electrical trace, and an output grounding terminal attached to the printed circuit board radially outward of the input grounding terminal and electrically connected to the filter device by an outer electrical trace, the output grounding terminal extending axially outward of the chamber, wherein the input grounding terminal is mounted on one side of the printed circuit board, wherein the filter device is included in a plurality of surface mounted filter devices that are attached to an opposite side of the printed circuit board and electrically connected to the input grounding terminal by an inner electrical trace on the opposite side of the printed circuit board, and wherein the output grounding terminal is included in a plurality of circumferentially spaced output grounding terminals that are attached to the printed circuit board in cantilever fashion radially outward of the input grounding terminal and electrically connected to the plurality of surface mounted filter devices by an outer electrical trace on the opposite side of the printed circuit board, the plurality of output grounding terminals extending axially outward of the chamber, and wherein the plurality of Output grounding terminals have feet that are soldered in plated through holes of the printed circuit board and that are interconnected by the outer annular trace on the opposite side of the printed circuit board and an outer annular trace on the one side of the printed circuit board and, wherein the connector body has an attachment tray at a rearward end, the attachment tray carrying a threaded stud that projects into a chamber for receiving a ring terminal.

11. The combination of a filtered electrical connector and a housing having a metal portion and a pass-through hole wherein the filtered electrical connector comprises a connector body that is attached to the housing and that has a back wall partly defining a chamber at one end of the connector body that is disposed in the pass-through hole of the housing, an alternating current filter retained in the chamber, and a terminal that extends through the back wall, the chamber, and the alternating current filter disposed in the chamber of the connector body and into the housing through the pass-through hole, wherein the alternating current filter comprises a printed circuit board having an input grounding terminal contacting the terminal that extends through the back wall, the chamber, and the alternating current filter disposed in the chamber, and wherein the alternating current filter comprises a filter device electrically connected to the input grounding terminal, and an output grounding terminal electrically connected to the filter device, the output grounding terminal extending out of the chamber and grounded to the metal portion of the housing.

12. The combination as defined in claim 11 wherein the filter device is electrically connected to the input grounding terminal by an inner electrical trace, and the output grounding terminal is electrically connected to the filter device by an outer electrical trace.

13. The combination as defined in claim 12 wherein the chamber is an open-ended chamber, wherein the connector body has a shroud that projects forwardly of the end wall and into the pass-through hole of the housing to partly define the open-ended chamber, wherein a cap is mounted on the shroud to protect the filter device and guide the shroud into the pass-through hole of the housing, and wherein the terminal projects though the cap and into the housing.

14. The combination as defined in claim 13 wherein the input grounding terminal is mounted on one side of the printed circuit board, wherein the filter device is included in a plurality of surface mounted filter devices that are attached to an opposite side of the printed circuit board and electrically connected to the input grounding terminal by an inner electrical trace, and the output grounding terminal is included in a plurality of circumferentially spaced output grounding terminals that are attached to the printed circuit board in cantilever fashion radially outward of the input grounding terminal and electrically connected to the plurality of surface mounted filter devices by an outer electrical trace, the plurality of output grounding terminals extending out of the open ended chamber and grounded to the metal portion of the housing.

15. A filtered electrical connector comprising:
a connector body having a back wall partly defining a chamber at one end of the connector body,
an alternating current filter retained in the chamber, and
a terminal extending through the back wall, the chamber, and the alternating current filter disposed in the chamber,
the alternating current filter having a printed circuit board, an input grounding terminal attached to the printed circuit board contacting the terminal that extends through the chamber, a filter device attached to a side of the printed circuit board facing a back wall of the connector body and electrically connected to the input grounding terminal and an output grounding terminal attached to the printed circuit board radially outward of the input grounding terminal and electrically connected to the filter device, the output grounding terminal extending axially outward of the chamber,
wherein the chamber is an open-ended chamber that is partly defined by a shroud of the connector body that projects forwardly of the back wall,
wherein a cap is mounted on the shroud to close the open-ended chamber and protect the alternating current filter,
wherein the terminal projects though the cap,
wherein the output grounding terminal is disposed adjacent an outer peripheral surface of the cap, and
wherein the chamber is filled with a sealant between the back wall of the connector body and the opposite side of the printed circuit board.

16. A filtered electrical connector comprising:
a connector body having a back wall partly defining a chamber at one end of the connector body,
an alternating current filter retained in the chamber, and
a terminal extending through the back wall, the chamber, and the alternating current filter disposed in the chamber,
the alternating current filter having a printed circuit board, an input grounding terminal attached to the printed circuit board contacting the terminal that extends through the chamber, a filter device attached to the printed circuit board and electrically connected to the input grounding terminal by an inner electrical trace, and an output grounding terminal attached to the printed circuit board radially outward of the input grounding terminal and electrically connected to the filter device,
wherein the input grounding terminal is mounted on one side of the printed circuit board,
wherein the filter device is included in a plurality of surface mounted filter devices that are attached to an opposite side of the printed circuit board and electrically connected to the input grounding terminal,
wherein the output grounding terminal is included in a plurality of circumferentially spaced output grounding terminals that are attached to the printed circuit board in cantilever fashion radially outward of the input grounding terminal and electrically connected to the plurality of surface mounted filter devices, the plurality of output grounding terminals extending axially outward of the chamber, and
wherein the connector body has an attachment tray at a rearward end, the attachment tray carrying a threaded stud that projects into a chamber for receiving a ring terminal.

* * * * *